(12) United States Patent
Jia et al.

(10) Patent No.: US 12,079,312 B2
(45) Date of Patent: Sep. 3, 2024

(54) MACHINE LEARNING OUTLIER DETECTION USING WEIGHTED HISTOGRAM-BASED OUTLIER SCORING (W-HBOS)

(71) Applicant: Microsoft Technology Licensing, LLC, Redmond, WA (US)

(72) Inventors: Yuting Jia, Redmond, WA (US); Jayaram N. M. Nanduri, Issaquah, WA (US); Kiyoung Yang, Sammamish, WA (US); Yini Zhang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 933 days.

(21) Appl. No.: 17/121,475

(22) Filed: Dec. 14, 2020

(65) Prior Publication Data
US 2022/0101069 A1    Mar. 31, 2022

Related U.S. Application Data

(60) Provisional application No. 63/085,530, filed on Sep. 30, 2020.

(51) Int. Cl.
*G06N 20/00* (2019.01)
*G06F 17/18* (2006.01)
(Continued)

(52) U.S. Cl.
CPC .......... *G06F 18/2433* (2023.01); *G06F 17/18* (2013.01); *G06F 18/2135* (2023.01); *G06Q 10/0633* (2013.01)

(58) Field of Classification Search
CPC .. G06F 18/2433; G06F 17/18; G06F 18/2135; G06F 18/2113; G06Q 10/0633;
(Continued)

(56) References Cited

U.S. PATENT DOCUMENTS 10,270,788 B2 *   4/2019   Faigon ................... G06N 20/00
10,460,377 B2 * 10/2019   Waks ...................... G06Q 40/12
(Continued)

OTHER PUBLICATIONS

Aryal, et al., "Improved Histogram-Based Anomaly Detector with the Extended Principal Component Features", In Repository of arXiv:1909.12702v1, Sep. 27, 2019, 13 Pages.
(Continued)

*Primary Examiner* — Hien L Duong
(74) *Attorney, Agent, or Firm* — Mannava & Kang, P.C.

(57) ABSTRACT

Different automatic tasks are facilitated via outlier detection in datasets using a Weighted Histogram-based Outlier Scoring (W-HBOS). An initial set of features is extracted from a processed dataset. The initial set of features is further filtered by applying robust statistics for size reduction. A second round of automatic feature selection is implemented based on maximum-entropy estimation so that a selected set of features that can give maximum possible information from different dimensions towards detecting anomalies are selected. The selected set of features are transformed to generate principal components that are provided to the W-HBOS-based model for outlier detection. A subset of outliers in one of the directions can be selected and reason codes are identified using back transformation for the execution of a desired automatic task.

19 Claims, 14 Drawing Sheets

(51) Int. Cl.
  *G06F 18/2135* (2023.01)
  *G06F 18/2433* (2023.01)
  *G06Q 10/0633* (2023.01)

(58) Field of Classification Search
  CPC .. G06Q 20/4016; G06N 20/00; G06V 10/764; G06V 10/771
  See application file for complete search history.

(56) References Cited

U.S. PATENT DOCUMENTS

| | | | |
|---|---|---|---|
| 10,505,819 | B2 | 12/2019 | Yadav et al. |
| 10,586,330 | B2 | 3/2020 | Abedini et al. |
| 11,509,674 | B1* | 11/2022 | Beauchesne ........ H04L 63/1425 |
| 11,853,853 | B1* | 12/2023 | Beauchesne ........ G06F 18/2133 |
| 2016/0260222 | A1* | 9/2016 | Paglieroni ............... G01S 7/411 |
| 2017/0353477 | A1* | 12/2017 | Faigon .................. G06F 21/554 |
| 2018/0293292 | A1* | 10/2018 | Odibat ................ G06F 16/9535 |
| 2019/0114655 | A1* | 4/2019 | Saarenvirta ........ G06Q 30/0207 |
| 2019/0124045 | A1* | 4/2019 | Zong ........................ G06N 7/01 |
| 2020/0097810 | A1 | 3/2020 | Hetherington et al. |
| 2020/0193013 | A1* | 6/2020 | Hong .................... G06F 21/577 |
| 2020/0381084 | A1* | 12/2020 | Kawas ................ G06F 18/2135 |
| 2021/0019753 | A1* | 1/2021 | Zhao ....................... G06N 5/045 |
| 2021/0248448 | A1* | 8/2021 | Branco .................. G06N 3/044 |
| 2021/0256538 | A1* | 8/2021 | Butvinik ............... G06N 20/00 |
| 2021/0365643 | A1* | 11/2021 | Agrawal ................ G06N 20/00 |
| 2022/0084704 | A1* | 3/2022 | Abdel-Khalik ........ G06N 20/00 |
| 2022/0138504 | A1* | 5/2022 | Fathi Moghadam .. G06N 20/20 706/12 |

OTHER PUBLICATIONS

"International Search Report and Written Opinion Issued in PCT Application No. PCT/US21/034693", Mailed Date: Sep. 7, 2021, 12 Pages.
"National Retail Security Survey", Retrieved from: https://cdn.nrf.com/sites/default/files/2019-06/NRSS%202019.pdf, 2019, 28 Pages.
"Outlier Detection DataSets (ODDS)", Retrieved from: https://web.archive.org/web/20200906101717/http:/odds.cs.stonybrook.edu/, Sep. 6, 2020, 5 Pages.
Becker, et al., "The Masking Breakdown Point of Multivariate Outliers Identification Rules", In Journal of the American Statistical Association, vol. 94, Issue (447), Sep. 1, 1999, pp. 947-955.
Bouguettaya, et al., "Efficient Agglomerative Hierarchical Clustering", In Journal of Expert Systems with Applications, vol. 42, Issue 5, Apr. 1, 2015, pp. 2785-2797.
Breunig, et al., "LOF: Identifying Density-based Local Outliers", In Proceedings of the ACM SIGMOD International Conference on Management of Data, May 16, 2000, pp. 93-104.
Buzby, et al., "Estimated Fresh Produce Shrink and Food Loss in US Supermarkets", In Journal of Agriculture, vol. 5, Issue 3, Sep. 5, 2015, pp. 626-648.
Chen, KE, "On k-Median Clustering in High Dimensions", In Proceedings of the Seventeenth Annual ACM-SIAM Symposium on Discrete Algorithm, Jan. 22, 2016, pp. 1177-1185.
Connell, et al., "Retail Video Analytics: An Overview and Survey", In Video Surveillance and Transportation Imaging Applications, Mar. 19, 2013, 4 Pages.

Cover, et al., "Nearest Neighbor Pattern Classification", In Journal of IEEE transactions on Information Theory, vol. 13, Issue 1, Jan. 1967, pp. 1-12.
Goldstein, et al., "Histogram-based Outlier Score (hbos): A Fast Unsupervised Anomaly Detection Algorithm", In KI-2012: Poster and Demo Track, Sep. 24, 2012, pp. 59-63.
Gu, et al., "Detecting Anomalies in Network Traffic Using Maximum Entropy Estimation", In Proceedings of the 5th ACM SIGCOMM Conference on Internet Measurement, Oct. 19, 2005, pp. 345-350.
He, et al., "Discovering Cluster-based Local Outliers", In Journal of Pattern Recognition Letters, vol. 24, No. 9-10, Jun. 1, 2003, 13 Pages.
Isard, et al., "Condensation—Conditional Density Propagation for Visual Tracking", In International Journal of Computer Vision, vol. 29, Issue 1, Aug. 1, 1998, pp. 5-28.
Kim, Daejin, "Outlier Detection Method Introduction", Retrieved from: https://www.slideshare.net/DaeJinKim22/outlier-detection-method-introduction-129968281, Jan. 31, 2019, 27 pages.
Kullback, et al., "On Information and Sufficiency", In the Annals of Mathematical Statistics, vol. 22, Issue 1, Mar. 1, 1951, pp. 79-86.
Kullback, Solomon, "Information Theory and Statistics", Published by Dover Publications, Inc., 1978, 409 Pages.
Lenderink, Rick J., "Unsupervised Outlier Detection in Financial Statement Audits", In MS Thesis, University of Twente, Sep. 2019, 86 Pages.
Mierswa, et al., "Yale: Rapid Prototyping for Complex Data Mining Tasks", In Proceedings of the 12th ACM SIGKDD International Conference on Knowledge Discovery and Data Mining, Aug. 20, 2006, pp. 935-940.
Pascoal, et al., "Robust Feature Selection and Robust PCA for Internet Traffic Anomaly Detection", In Proceedings of IEEE Infocom, Mar. 25, 2012, pp. 1755-1763.
Paulauskas, et al., "Application of Histogram-Based Outlier Scores to Detect Computer Network Anomalies", In Journal of Electronics, Nov. 1, 2019, pp. 1-8.
Pechenizkiy, et al., "PCA-based Feature Transformation for Classification: Issues in Medical Diagnostics", In Proceedings of 17th IEEE Symposium on Computer-Based Medical Systems, Jun. 25, 2004, 6 pages.
Pevný, Tomáš, "Loda: Lightweight on-line Detector of Anomalies", In Journal of Machine Learning, vol. 102, Issue 2, Feb. 1, 2016, pp. 275-304.
Raman, et al., "Execution: The missing Link in Retail Operations", In California Management Review, vol. 43, Issue 3, Mar. 1, 2001, pp. 136-152.
Rousseeuw, et al., "Robust Statistics for Outlier Detection", In Wiley Interdisciplinary Reviews: Data Mining and Knowledge Discovery, vol. 1, Issue 1, Jan. 2011, pp. 73-79.
Trinh, et al., "Detecting Human Activities in Retail Surveillance Using Hierarchical Finite State Machine", In Proceedings of IEEE International Conference on Acoustics, Speech and Signal Processing, May 22, 2011, pp. 1337-1340.
Wang, et al., "Progress in Outlier Detection Techniques: A Survey", In Proceedings of IEEE Access, vol. 7, Aug. 2, 2019, pp. 107964-108000.
Yilmaz, et al., "Unsupervised Anomaly Detection via Deep Metric Learning with End-to-End Optimization", In Repository of arXiv preprint arXiv:2005.05865, May 12, 2020, pp. 1-11.
Zhang, Ji, "Advancements of Outlier Detection: A Survey", In Journal of ICST Transactions on Scalable Information Systems, vol. 13, Issue 01-03, Jan. 2013, pp. 1-26.

\* cited by examiner

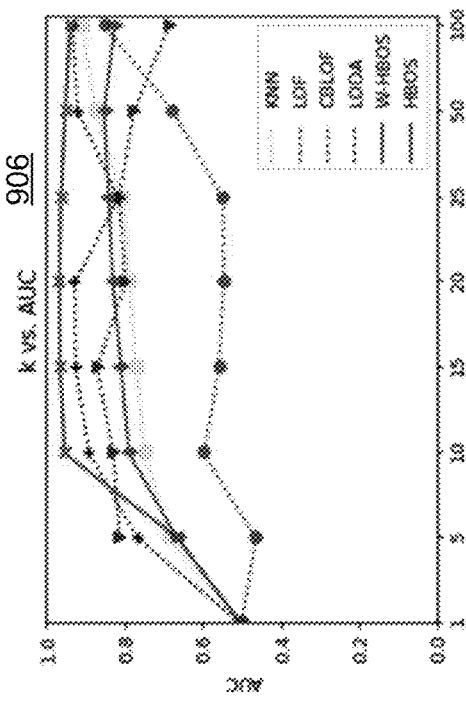
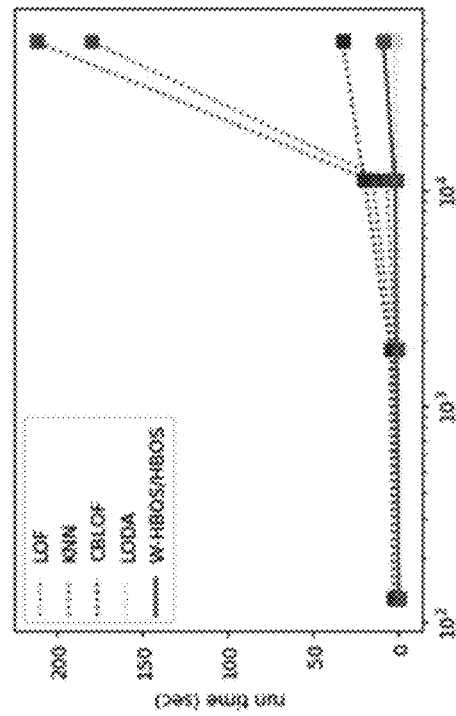
| Dataset | Dimension | Description |
|---|---|---|
| shuttle | (49097,9) | Dataset of space shuttle features |
| cardio | (1831,21) | dataset of Cardiotocograms measurement |
| mammography | (11183,6) | Data set of mammographic images |
902
| | shuttle | cardio | mammography | average AUC |
|---|---|---|---|---|
| KNN | 0.808 | 0.909 | 0.853 | 0.857 |
| LOF | 0.531 | 0.852 | 0.801 | 0.728 |
| CBLOF | 0.992 | 0.842 | 0.859 | 0.898 |
| LODA | 0.965 | 0.944 | 0.877 | 0.929 |
| W-HBOS | 0.979 | 0.967 | 0.867 | 0.938 |
| HBOS | 0.907 | 0.852 | 0.792 | 0.850 |
904
FIG. 9

1000

| Raw Score Percentile | Calibrated Score |
|---|---|
| > 90% | 900 - 999 |
| 80% - 90% | 800 - 899 |
| 70% - 80% | 700 - 799 |
| 60% - 70% | 600 - 699 |
| 50% - 60% | 500 - 599 |

1010

| Scenarios | Mean Percentiles Anomaly group features | Mean Percentiles of Benchmark group features | Differences In Percentiles |
|---|---|---|---|
| Store employee per working hour had higher monetary value of returns than other employees | 84.8 | 48.4 | +36.4 |
| Cash to Card return ratio | 75.6 | 48.8 | +26.8 |
| Store employee had higher monetary value of returns with no original receipt scanned | 62.3 | 49.5 | +12.8 |
| Employee discount sales were executed using multiple payment cards | 57.2 | 49.8 | +7.4 |
| Sales of discounted items which were sold without discount in the same store and period | 55.0 | 49.9 | +5.1 |

1060

| Business Impact | Anomaly Group | | Benchmark Group | | Differences In Mean Monetary Value |
|---|---|---|---|---|---|
| | # of Staff | Mean Monetary Value per Staff | # of Staff | Mean Monetary Value per Staff | |
| Return | 234 | 17,378 | 4,682 | 10,572 | +6,806 |
| Discount | | 36,229 | | 28,034 | +8,243 |

MACHINE LEARNING OUTLIER DETECTION USING WEIGHTED HISTOGRAM-BASED OUTLIER SCORING (W-HBOS)

PRIORITY

This application is a non-provisional application of U.S. provisional patent application Ser. No. 63/085,530, entitled "Detecting Anomalous Behaviors for Loss Prevention Using Weighted Histogram-Based Outlier Scoring (W-HBOS)", filed on Sep. 30, 2020, the entirety of which is incorporated herein by reference.

BACKGROUND

Anomaly detection is a process that identifies anomalies or outliers in a dataset, i.e., points in the dataset that do not fit in with a pattern found throughout the dataset. Traditionally, anomaly detection was manual. However, with the rapid growth of data, various tools are being developed to look for anomalies that do not subscribe to the normal data patterns. The detected anomalies or outliers can point to unusual data patterns which in turn help in analyzing data for errors, failures, or even fraud depending on the data domain. With hundreds or even thousands of items to monitor, anomaly detection can help point out where an error is occurring, enhancing root cause analysis and quickly addressing or rectifying the issue.

Loss Prevention (LP) is a research topic that targets reducing fraud and the associated losses, called "shrink", that occur in retail establishments, e.g., brick and mortar stores. Shrink refers to any type of revenue loss in inventory systems related to employee theft (internal), shoplifting (external), paperwork and administrative errors, or other frauds. This type of research is conducted using historical transaction data to detect anomalies in different kinds of shrink scenarios, to improve store efficiencies, and further to design more actionable insights to prevent shrink losses.

To detect and prevent the shrink losses regardless of either unintentional human fatigue or unfortunate misbehaviors of bad cashiers, some researchers discussed using Retail Video Analytics. Retail Video Analytics applies a hierarchical finite state machine for motion pattern recognition. Another cause of shrink is inventory record inaccuracy and misplaced SKUs (Stock Keeping Units), which could significantly induce loss of sales and gross margins, and add extra labor and inventory carrying costs. For example, when an out-of-stock item at a retailer is reported as in stock, the item may never be reordered or re-stocked within the store. Another aspect of inventory management includes supermarkets experiencing a decrease in their marginal or incremental returns due to the fresh produce shrink and food loss. Being able to accurately forecast the number of fresh fruits and vegetables that go unsold and rotten in supermarkets is important to prevent the loss from fresh produce shrink. The causes can include the lack of high-quality packaging; greens were not refrigerated promptly; customers being hesitant to purchase some fresh products due to the lack of knowledge about the product and how to prepare it, etc.

BRIEF DESCRIPTION OF DRAWINGS

Features of the present disclosure are illustrated by way of examples shown in the following figures. In the following figures, like numerals indicate like elements, in which:

FIG. 9 includes tables and graphs that show the performance of a Weighted Histogram-Based Outlier Scoring (W-HBOS) model in accordance with the examples disclosed herein.

FIG. 10 shows a table with score calibration using the raw score percentile in accordance with the examples disclosed herein.

DETAILED DESCRIPTION

Figure 1:
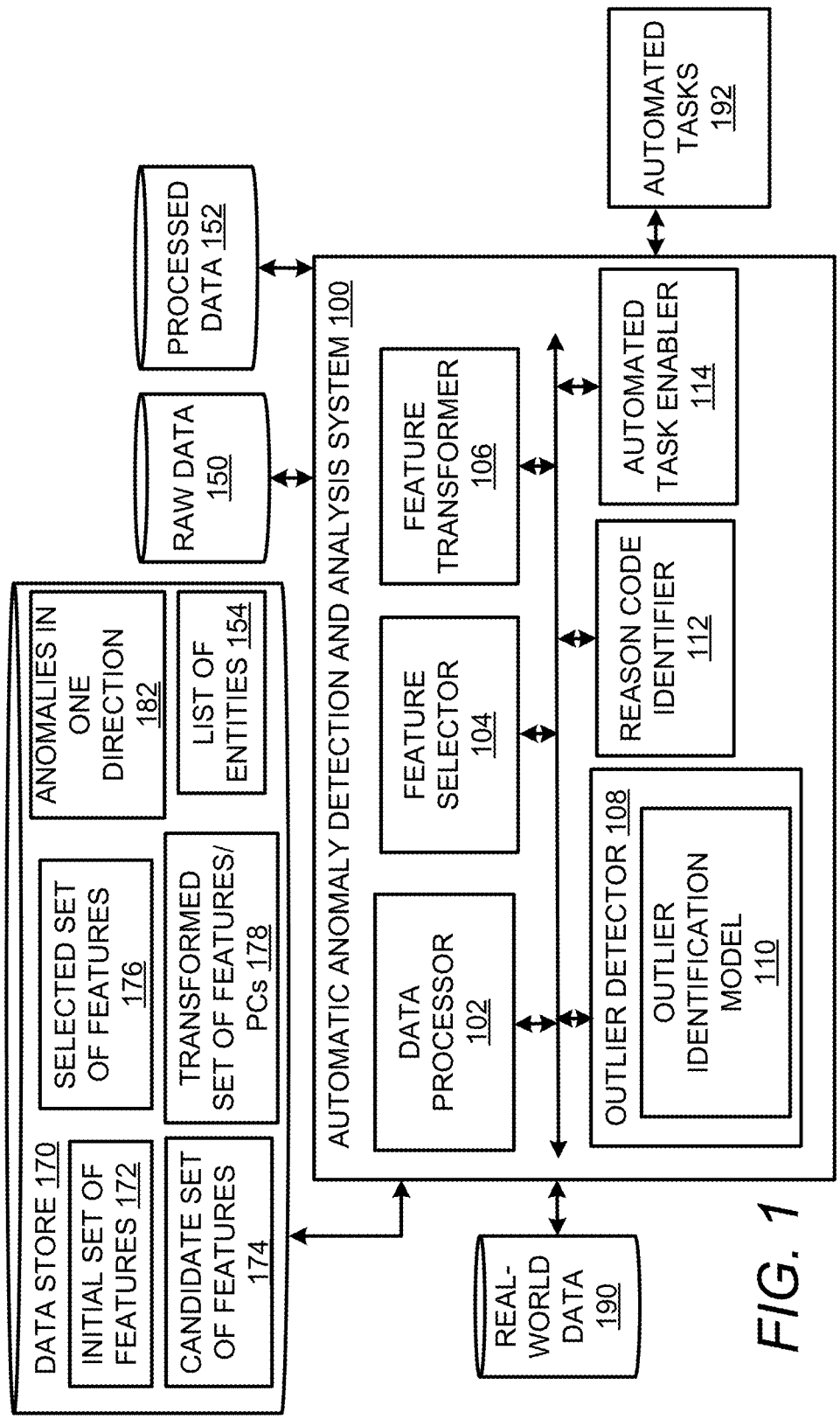
FIG. 1 shows a block diagram of an automatic anomaly detection and analysis system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to an example of the present disclosure, an intelligent ML model is used to more effectively and efficiently detect significant anomalous items or outliers. The intelligent ML model is referred to as W-HBOS. Histogram-Based Outlier Scoring (HBOS) is a fast computing unsupervised learning algorithm for anomaly detection based on a combination of univariate features. Despite its advantage of being cost-efficient for scenarios with large data sets, one drawback of HBOS is that the model is built up under the assumption that the features being modeled are independent of each other. This is difficult to maintain in the real world as the number of features increases and as the anomaly detection scenarios get more complex. Another less ideal characteristic of the HBOS technique is that it is difficult to provide a consistent explanation for the scores of the output of the HBOS model. Considering that the scores are provided based on a set of features, both high-percentile and low-percentile anomalies could be scored high. The W-HBOS model improves on the drawbacks of the HBOS model through an automated feature selection and orthogonal feature transformation, as is further discussed below.

When a large set of features is applied to train the W-HBOS model, the independence of numerical features is aided through a two-step feature selection algorithm. In other words, to minimize the dependency among features, the two-step feature selection algorithm filters out highly correlated numerical features. Then, an orthogonal numerical feature transformation is performed by using Principal Component Analysis (PCA) to further reduce possible dependencies. Finally, the transformed independent features are used as the inputs to the W-HBOS model. Additionally, reason codes are generated, which are derived by a feature back-transformation method. The reason codes can help explain which features contribute the most to a detected anomaly.

When applying the disclosed outlier detection to the retail domain, one of the shrink examples that can be addressed by a good machine learning (ML) algorithm can include the discount and refund abuse scheme. In this scheme, the discounts reserved for the employee as job benefits are used by non-employees who could be the employee's friends, relatives, or strangers who do not intend to own the merchandise but rather exploit the price difference. When they return the merchandise, the refunded amount is higher than the original purchase amount that had applied the employee's discount thereby providing a net profit for the fraudster. For merchants, in addition to the loss of margin earned, it also increases the labor costs including but not limited to inspecting, repacking, restacking the returned merchandise, and updating inventory. The challenge of the current loss prevention methods is that no intelligent machine learning (ML) based system exists and the investigation of shrink still relies heavily on the labor-intensive manual check using report or case type of mechanism which is not only time-consuming but also less accurate with a significant lag. While such proposed solutions enable some retailers to significantly improve their profitability, such solutions are, however, very labor-intensive without further assistance from intelligent automatic mechanisms and are not feasible for larger retailers with hundreds of affiliated branches.

The W-HBOS model and the feature back-transformation method for determining reason codes may be incorporated in a loss prevention system that can detect and explain anomalies in merchant data that may be indicative of shrink loss. The system can perform effective inventory inspection (via audits and sampling) and can benchmark performances among different stores to improving retailer operation execution. For example, the system can apply current information technology (IT) to automatically store merchant data and apply the W-HBOS model to the merchant data to detect anomalous behaviors for shrink loss prevention. The system can generate reason codes to explain which features contribute the most to an anomaly that is detected. Also, the system can identify top-scoring entities, e.g., staff, points of sales, etc., which may be considered suspicious entities that could cause shrink.

Although loss prevention is provided as one example of scenarios where W-HBOS can be used for detecting anomalous behaviors. However, as presented in our paper where W-HBOS is proposed and is compared with other techniques, W-HBOS can be applied to various other scenarios where it is crucial to identify anomalous activities, but we cannot utilize supervised machine learning techniques due to the lack of clear anomaly indicators. For example, in an insurance fraud scenario, W-HBOS can be employed to identify abnormal insurance claims which would result in defrauding the insurance firm. It can also be applied to health care fraud scenarios for identifying anomalous activities from providers that would lead to health insurance fraud and defraud an insurer or government health care program.

FIG. 1 shows a block diagram of an automatic anomaly or outlier detection and analysis system 100 (herein also referred to as "the system 100") in accordance with the examples disclosed herein. The system 100 can be communicatively coupled to a data store 170 and includes a data processor 102, a feature selector 104, a feature transformer 106, an outlier detector 108 based on an outlier identification model 110, a reason code identifier 112, and an automated task enabler 114. The system 100 including the outlier identification model 110 is initially trained using raw data 150 related to the anomalies to be identified for various purposes in different domains. By way of illustration and not limitation, the anomalies may need to be identified for fraud detection, to detect malfunctioning machines or other hardware or software systems, or to identify other unusual patterns in the raw data 150. For example, if the task pertains to fraud detection in a retail establishment, then the raw data 150 can include but is not limited to transaction data, sales data, payment data, payment method data, etc. which includes entities and transactions conducted by entities, such as humans, point of sale devices, etc. Similarly, if the task pertains to identifying breakdowns in machines or malfunctioning systems the raw data 150 can include the hours of system operations, the maintenance schedules, error logs of malfunctions or errors generated by the system 100, etc. The raw data 150 is processed by the system 100 for feature extraction, anomaly detection, and reason code identification so that the cause for anomaly occurrence can be identified and rectified if needed via execution of one or more automated tasks 192.

The data processor 102 initially accesses raw data 150 and executes data processing functions such as data quality checks etc. Data processing functions such as but not limited to, verification of the entities and dates, data de-duplication, and missing value identification are also executed by the data processor 102 to generate processed data 152.

The processed data 152 is provided to the feature selector 104 for the extraction of features. Different features are extracted based on the processed data 152 and the task to be executed. Examples may be discussed herein related to fraud detection based on merchant data, however it can be appreciated that the processing techniques disclosed herein can be applied to outlier detection in different types of data from various domains to execute different functions. Referring to the merchant data, different features, such as returns, discounts, payment methods, etc., can be extracted from the processed data 152 and stored as an initial set of features 172. When a large set of features, e.g., numerical features, are applied to train the outlier identification model 110, the independence of the numerical features is ensured through the two-step feature selection process that enables filtering out the highly correlated numerical features, thereby generating a candidate set of features 174 from the first feature selection step and finally a selected set of features 176 from the second feature selection step that applies a divergence criterion to relative entropies of the features as detailed further herein.

The feature transformer 106 conducts orthogonal numerical feature transformation by using PCA to further reduce possible dependencies to generate a transformed set of features 178. PCA reduces the dimensionality of large data sets by transforming the large set of variables into a smaller set that contains most of the information of the large set thereby simplifying the analysis involved in exploring the dataset without significant loss of accuracy. The selected set of features 176 are thus transformed by the feature transformer 106 into the transformed set of features 178 that are independent and are used by the outlier detector 108 as inputs to the outlier identification model 110. In an example, the outlier identification model 110 can include W-HBOS which will be discussed in further detail below.

The output of the outlier detector 108 can include outliers or anomalies associated with the processed data 152. More particularly, the anomalies or set of outliers can include in one particular direction i.e., either at the higher end or the lower end are identified by the outlier detector 108. However, the system 100 is configured to detect anomalies to execute specific tasks. Therefore, the anomalies in a particular direction are selected and output by the outlier detector 108 for further processing. The selection of the anomalies in one direction for further processing may depend on the task to be executed and the nature of the features being processed. For example, when the task relates to fraud detection and the features being processed include transactions and transaction amounts, the anomalies at the higher end are selected for further processing instead of in the lower end. For example, outliers associated with a higher number of transactions are selected for further processing instead of the outliers associated with a lower number of transactions. The outlier identification model 110 which is fully trained on the principal components (PCs) and further configured to inhibit the impact of the outliers in one of the directions is now ready for use in detecting outliers in real-world data 190. Real-world data 190 may include data captured in a production environment, such as transactions performed for customers for fraud detection in those transactions. The outlier identification model 110 may be applied to any data set to detect anomalies in the data set to which the outlier identification model 110 is applied.

When applied to the real-world data 190, the outlier identification model 110 outputs the anomalies in one direction 182 which are further processed by the reason code identifier 112 to identify the causes for the anomalies. Referring again to the example of merchant data and fraud detection, the reason code identifier 112 employs the anomalies in one direction 182 to identify specific entities such as particular employees, specific transactions, or specific checkout counters that are disproportionately associated with particular types of transactions. For example, the transactions may be associated with cash-based return transactions wherein the purchased items are returned in exchange for cash. The reason code identifier 112 can be configured to identify the top m (wherein m is a natural number and m=1, 2, 3 . . . ) reasons and output a list of entities 154 for the outlier in the raw data 150. Therefore, employees or providers perpetrating fraud or components of a system that are contributing to system malfunction, or other reasons for anomalies in data can be isolated and identified. The automated task enabler 114 can execute automated tasks 192 based on the list of entities 154. For example, the automated tasks 192 can include generating and transmitting automatic alerts regarding the employees or providers suspected of perpetrating fraud to the appropriate authorized personnel in the fraud prevention scenario. In the system malfunction use case, alerts with the list of entities 154 which include attributes of a malfunctioning system or an external system exhibiting anomalous behavior (to which the real-world data 190 may pertain) can be generated and transmitted to preconfigured parties such as the system administration personnel.

Figure 2:
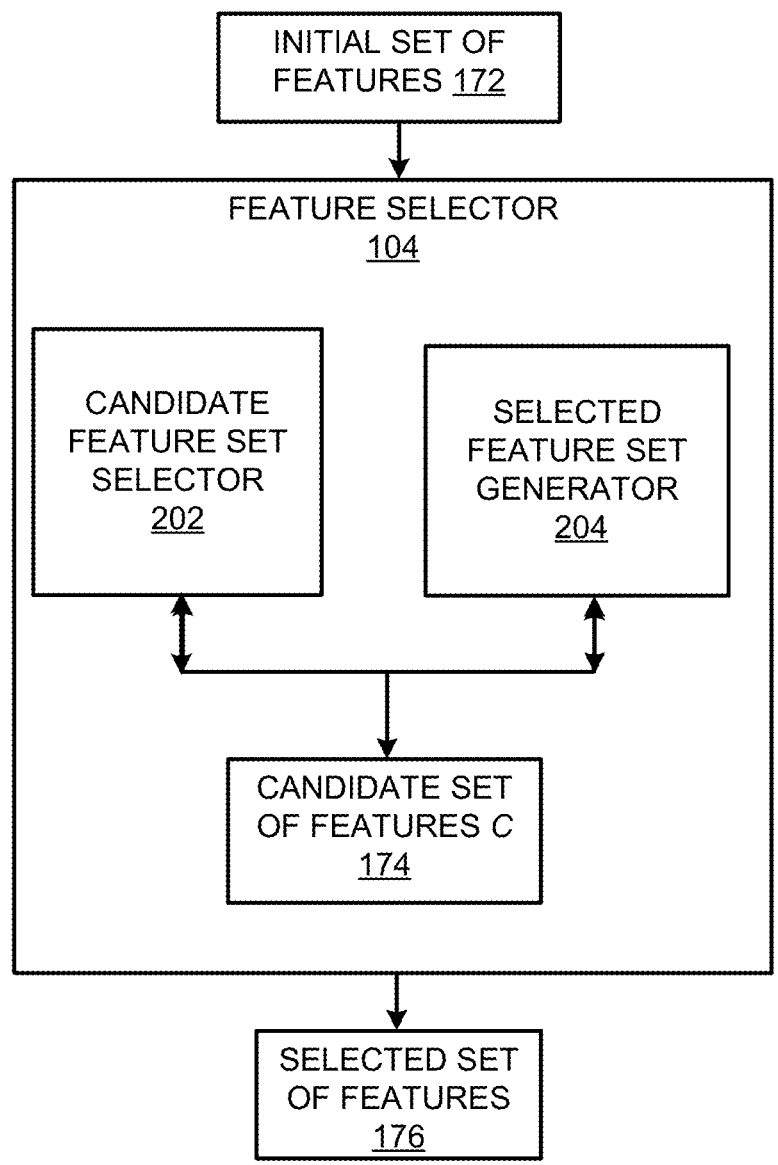
FIG. 2 shows a block diagram of a feature selector in accordance with the examples disclosed herein.

FIG. 2 shows a block diagram of the feature selector 104 in accordance with the examples disclosed herein. The feature selector 104 includes a candidate feature set selector 202 and the selected feature set generator 204. A large feature set is applied to train the outlier identification model 110. However, the independence of numerical features has to be ensured to derive accurate results from the outlier identification model 110. To minimize the dependency among the features, the system 100 implements a two-step feature selection process which can be used to figure out highly correlated numerical features. An initial set of features 172, $Z=\{X_1, X_2, \ldots, X_i, \ldots, X_K\}$, where K is the number of features (K=1, 2, 3, . . . ) in the feature set is provided to the candidate feature set selector 202 which implements feature selection based on statistics to identify significant contributors to the anomaly detection. Therefore, the size of the initial feature set Z is reduced to generate the candidate set of features 174, $C=\{C_1, C_2, \ldots, C_m, \ldots, C_M\}$, where M is the number of candidate features (M=1, 2, 3 . . . ) in the candidate's set of features 174. The candidate set of features 174 is further processed by the selected feature set generator 204 which implements another automatic feature selection procedure based on maximum entropy estimation so that features that provide maximum possible information from different dimensions towards detecting anomalies are selected to form the selected set of features 176, S.

Figure 3:
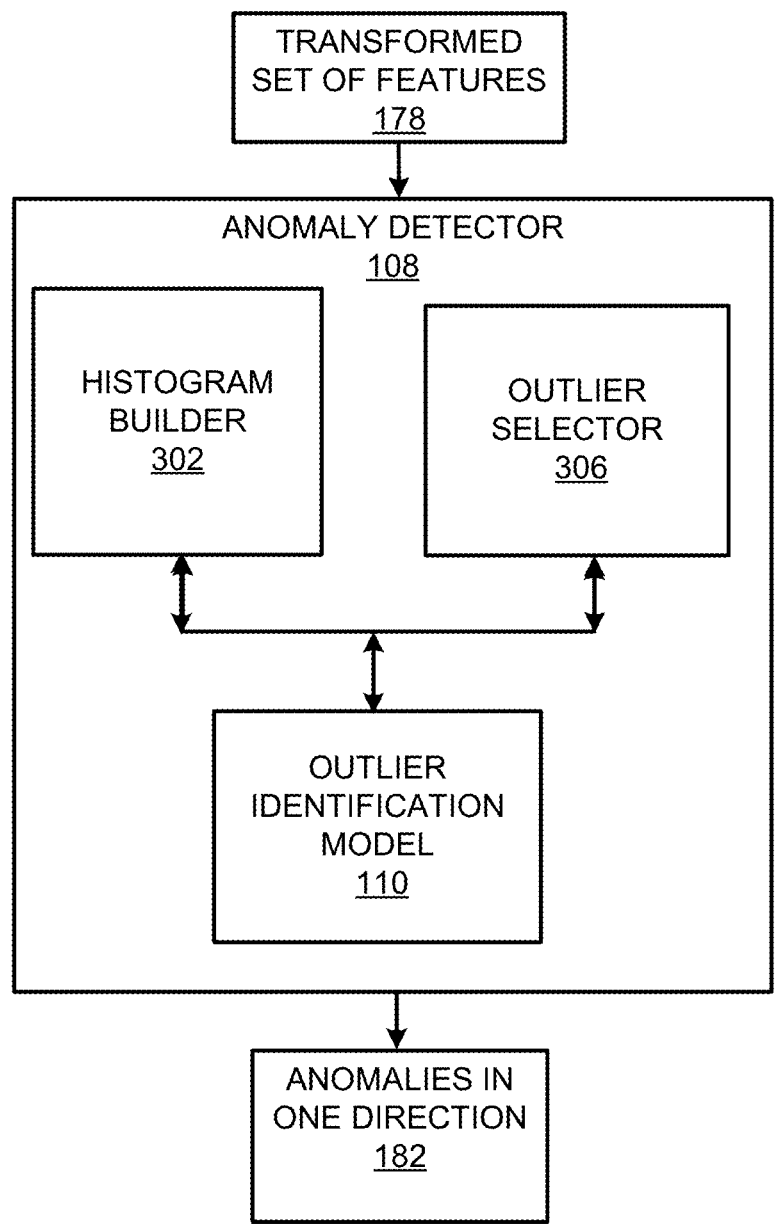
FIG. 3 shows a block diagram of an anomaly detector in accordance with the examples disclosed herein.

FIG. 3 shows a block diagram of the outlier detector 108 in accordance with the examples disclosed herein. The outlier detector 108 includes a histogram builder 302, the outlier identification model 110, and an outlier selector 306. As mentioned above, the outlier identification model 110 can be based on the HBOS algorithm. A discussion of the HBOS model, followed by a brief description of the W-HBOS model, which is derived from the HBOS model is provided below. The HBOS model is an algorithm that applies histogram-based detection in a general way. For categorical features, the histogram is constructed by the histogram builder 302 based on the relative frequency of each feature. For numerical features, two methods are offered: (1) Static bin-width histograms and (2) dynamic bin-width histograms, where the first method ensures that the bins with equal width are initially selected and the second method ensures that each bin has the same number of values. The outlier score for each instance p is calculated by:

$$HBOS(p) = \sum_{i=0}^{d} \log\left(\frac{1}{hist_i(p)}\right) \qquad \text{Eq. (1)}$$

where d represents feature dimensions (i.e., different features), and histograms are normalized with height as 1 to give equal weights.

In a further example, the outlier identification model 110 can implement a W-HBOS. One difference between the W-HBOS and the HBOS is that, instead of assigning equal weight for each feature as provided for by HBOS, the W-HBOS model is designed to apply eigenvalues ($\lambda_i$) of principal components (PCs) as weights for the corresponding features after the features are transformed using PCA. PCs are new variables (i.e., the transformed set of features 178) generated by the feature transformer 106 by implementing PCA for feature transformation. The PCs are constructed as linear combinations or mixtures of the initial variables (i.e., the selected set of features 176). These combinations are generated so that the new variables (i.e., PCs) are uncorrelated and most of the information within the initial variables is squeezed or compressed into the first few components. Therefore, a transformed, selected set of features is obtained as linear combinations of the selected set of features is generated via orthogonal feature transformation with eigenvalues from principal components as weights to corresponding features of the selected set of features. Assume k principal components are the input features for W-HBOS with $\lambda_i$ (i=1, 2, . . . , k) as eigenvalues, for every instance p, the weighted histogram-based outlier score is calculated by:

$$W - HBOS(p) = \sum_{i=0}^{k} \lambda_i \log\left(\frac{1}{hist_i(p)}\right) \quad \text{Eq. (2)}$$

Eq. (1) shown above for HBOS provides scores that reflect the outliers from both the tail directions i.e., outliers at the higher end and the outliers at the lower end of the data distribution. Therefore, the set of outliers can include at least two subsets, a higher value outlier subset, and a lower value outlier subset. Based on the use case scenario being applied, outliers at one of the ends (i.e., one of the higher value outlier subset or the lower value outlier subset) are selected for further processing while the outliers at the opposite end are discarded from further consideration by the outlier selector 306 to provide an output of a set of anomalies in one direction 182. For example, when aligned with the requirement of the employee fraud abuse scenario, the features are usually designed in a way that the higher percentile direction is more likely to indicate fraud. Therefore, higher scores can be expected for one direction (i.e. the higher percentile of distributions) and the impact from values below the median of each feature should be minimized. This can be achieved by assigning a median value for the values below it, pushing the original median bin to be the majority bucket, and lowering the inverse height of the histogram from that bin. This would further minimize the contribution of low-percentile direction to the score thereby enabling the outlier selector 306 to selected outliers from a particular direction.

Figure 4:
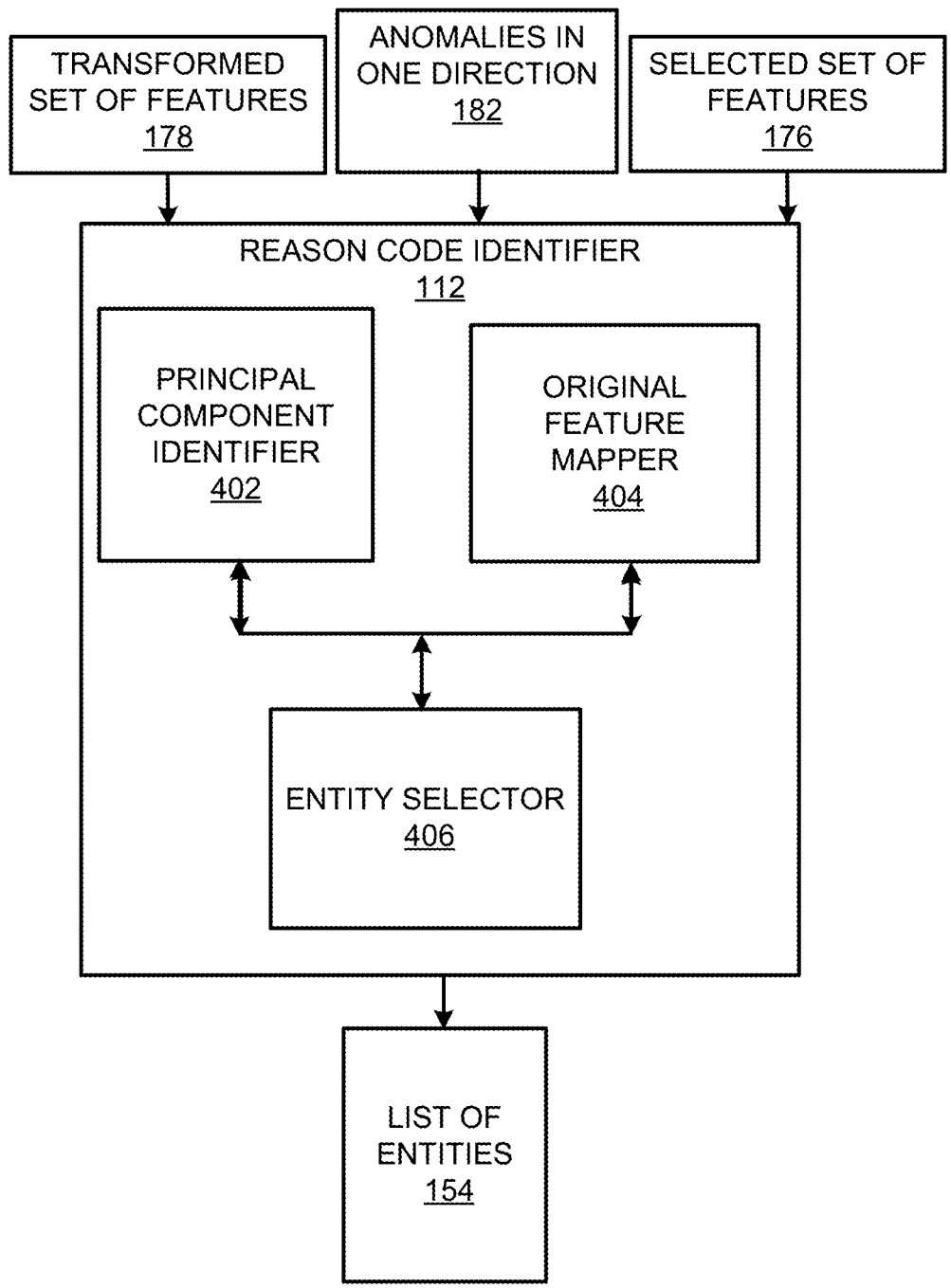
FIG. 4 shows a block diagram of a reason code identifier in accordance with the examples disclosed herein.

FIG. 4 shows a block diagram of the reason code identifier 112 in accordance with the examples disclosed herein. The reason code identifier includes a principal component identifier 402, an original feature mapper 404, and an entity selector 406. To have better interpretability for transformed features used for W-HBOS the reason code identifier 112 implements reason code back transformation using the PCA eigenvectors as the weights of the original features on the corresponding PCs. After performing PCA transformation on the selected set of features 176, i.e., S={$S_1, S_2, \ldots S_d$}, the percentile of each principal component (PC) value is calculated, and the PC with the highest percentile $V_i$ is selected by the principal component identifier 402 for further analysis. Alternately, the PC with the highest percentile $V_i$ is selected as the top reason code by the principal component identifier 402. The original feature mapper 404 then maps the PC with the highest percentile $V_i$ back to original feature space S, i.e., the selected set of features 176 to obtain the top final reason code $S_j$ where j is obtained using the following formula:

$$j = \text{argmax}(|V_i^1|, |V_i^2|, \ldots, |V_i^k|) \quad \text{Eq. (3)}$$

Since $S_j$ has the largest weight to represent for $V_i$, it is intuitively selected as the top final reason code. Similarly, the m-th top final reason code is obtained by first finding the PC with m-th highest percentile and then maps back to the original feature space using the above formula. This reason code back-transformation can help explain which features contribute the most to the anomaly detected. In an example, one or more entities associated with the feature $S_j$ can be identified and output by the entity selector 406. The provision of reason codes enhances the applicability of the system 100. In an example, when a data set is provided to the system 100, a list of entities 154 that are causes for loss which are further ranked in accordance with the corresponding contributions to the losses can be output by the system 100. As further discussed below, outputs of the system 100 which applies the W-HBOS model (outlier identification model 110) to merchant data includes a list of identified entities (list of entities 154), along with an outlier score for each entity per month, a reason code, raw values and percentile of features, the details of which are further discussed below. In the fraud detection example, the list of entities 154 may be a list of store clerks that processed a high number of in-store cash returns.

Figure 5A:
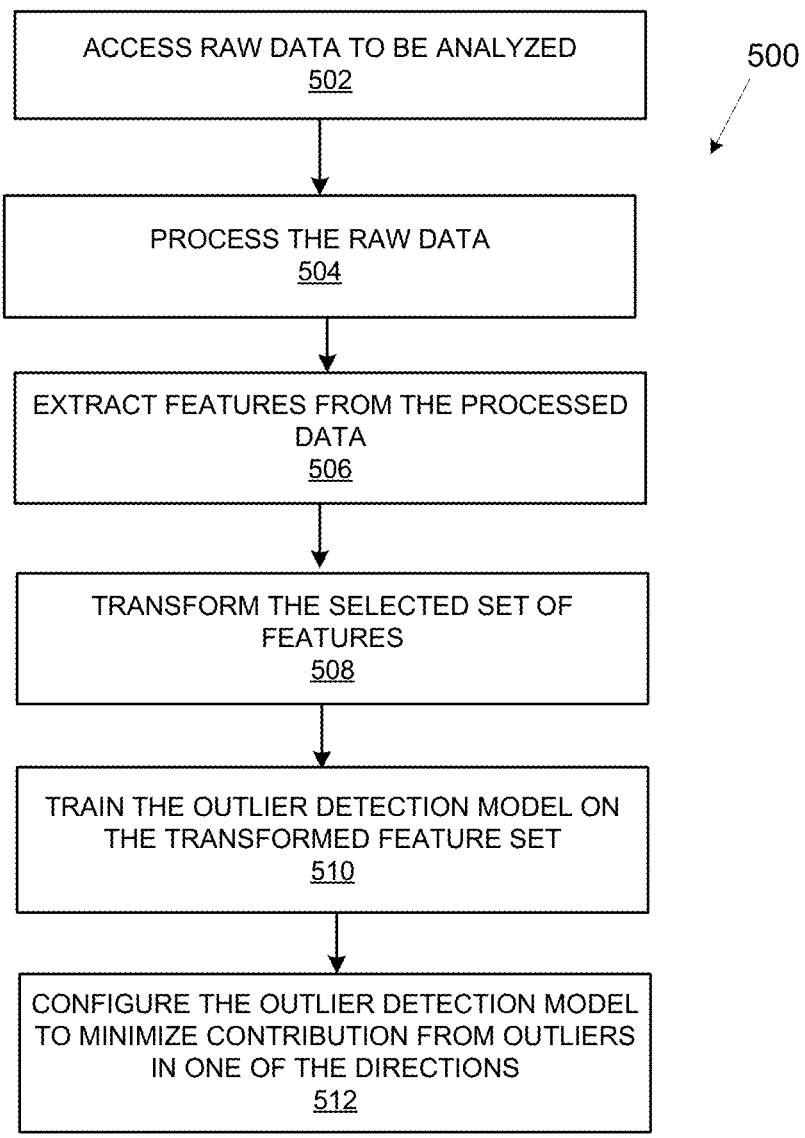
FIG. 5A shows a flowchart that details a method of training an outlier identification model in accordance with the examples disclosed herein.

FIG. 5A shows a flowchart 500 that details a method of training the outlier identification model 110 in accordance with the examples disclosed herein. The method begins at 502 wherein the raw data 150 to be analyzed is accessed. The raw data 150 is processed at 504 to be better formatted for feature selection. Data processing tasks such as correcting formatting errors, data de-duplication, completing the missing values, etc. are executed at 504 to generate processed data 152. At 506, the selected set of features 176 is extracted from the processed data 152 as described herein. The selected set of features 176 is further transformed at 508 using the PCA technique to generate the PCs or the transformed set of features 178. The transformed set of features 178 is used to train the outlier identification model at 510. In an example wherein the PCs are used to train the W-HBOS-based outlier identification model 110, it may be noted that all the principal components are used. The number of principal components used to train the outlier identification model 110 is not limited as the system 100 focuses more on removing dependency rather than feature dimension reduction. In an example, the transformed set of features 178 may be split into training data and test data to test the trained outlier identification model 110. At 512, the outlier identification model 110 is further configured to minimize the contribution of outliers from one of the directions. For example, in a fraud detection scenario, the impact from values below the median of each feature is to be minimized. This can be achieved by assigning a median value for values below the median value, pushing the original median bin to be the majority bucket, and reducing the inverse height of the histogram from that bin to be lower than the majority bucket. An inverse of this process can be implemented when the impact of the values above the median of each feature is to be minimized i.e. when the outliers at the lower end are to be selected.

Figure 5B:
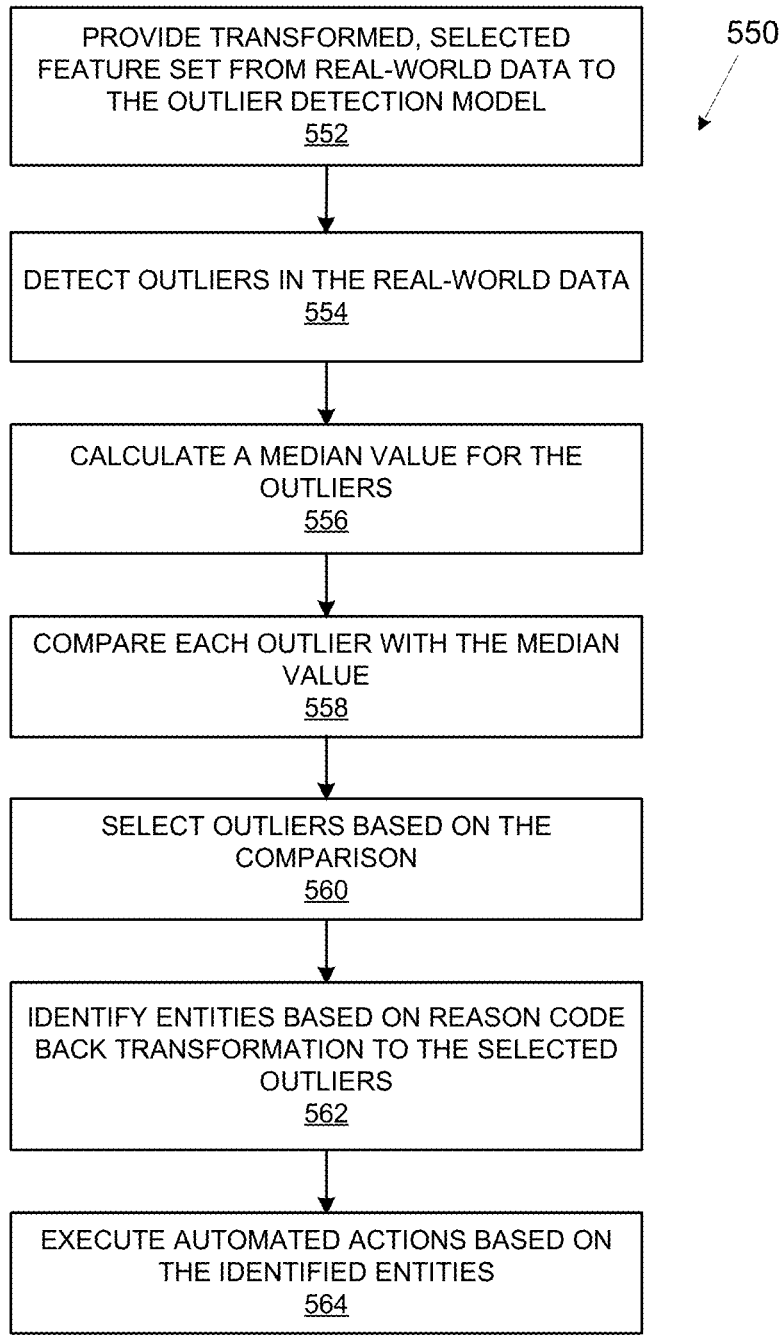
FIG. 5B shows a flowchart that details a method of executing one or more tasks using the trained outlier identification model in accordance with the examples disclosed herein.

FIG. 5B shows a flowchart 550 that details a method of executing one or more tasks using the trained outlier identification model 110 in accordance with the examples disclosed herein. Raw data such as merchant data from a real-world use case scenario such as loss prevention can be provided to an outlier identification model trained on data from the retail domain to obtain outliers in the merchant data to identify fraud or other loss-generating anomalies. Similarly, raw data such as system logs including the various operations executed by a hardware and/or software computer system can be provided to another outlier identification model which is trained on data from the computer operations domain to obtain outliers that are causing degradation of the system performance or other anomalous system operations. The various features including the initial set of features, the candidate set of features, the selected set of features are extracted as detailed herein from the real-world data, and the selected set of features is further transformed via orthogonal feature transformation and the transformed, selected set of features or the transformed set of features are provided to the trained outlier identification model. Accordingly, at 552, the transformed, selected set of features extracted from the real-world data 190 is provided to the outlier identification model 110 which is trained as described above for outlier detection. The outliers are detected from the real-world data 190 at 554 using the outlier identification model trained on the domain data pertaining to the domain of the real-world data 190. In an example, the outlier identification model can be further configured to minimize the impact of outliers in one direction based on the assignment of median values to the outliers as described herein. At 556, a median value is calculated and each outlier value is compared to the median value at 558. Based on the use-case scenario, an outlier value can be selected for further analysis or the outlier value can be discarded at 560. A reason code back transformation is implemented with the selected outliers to identify one or more entities at 562 that contribute to the outliers. At 564 further automated actions can be executed by the automated task enabler 114 based on the contributing entities. For example, email notifications with the list of entities 154 or other types of notifications may be automatically transmitted to parties preconfigured within the system 100 in the case of a fraud detection scenario. For system malfunction use-case, the appropriate personnel can be automatically informed regarding specific entities or factors that are contributing to the anomalies in the external system behavior. In other examples, remedial actions may be automatically performed, such as rescinding rights of staff identified in the list of entities 154 to use registers or other equipment to prevent further fraud.

Figure 6:
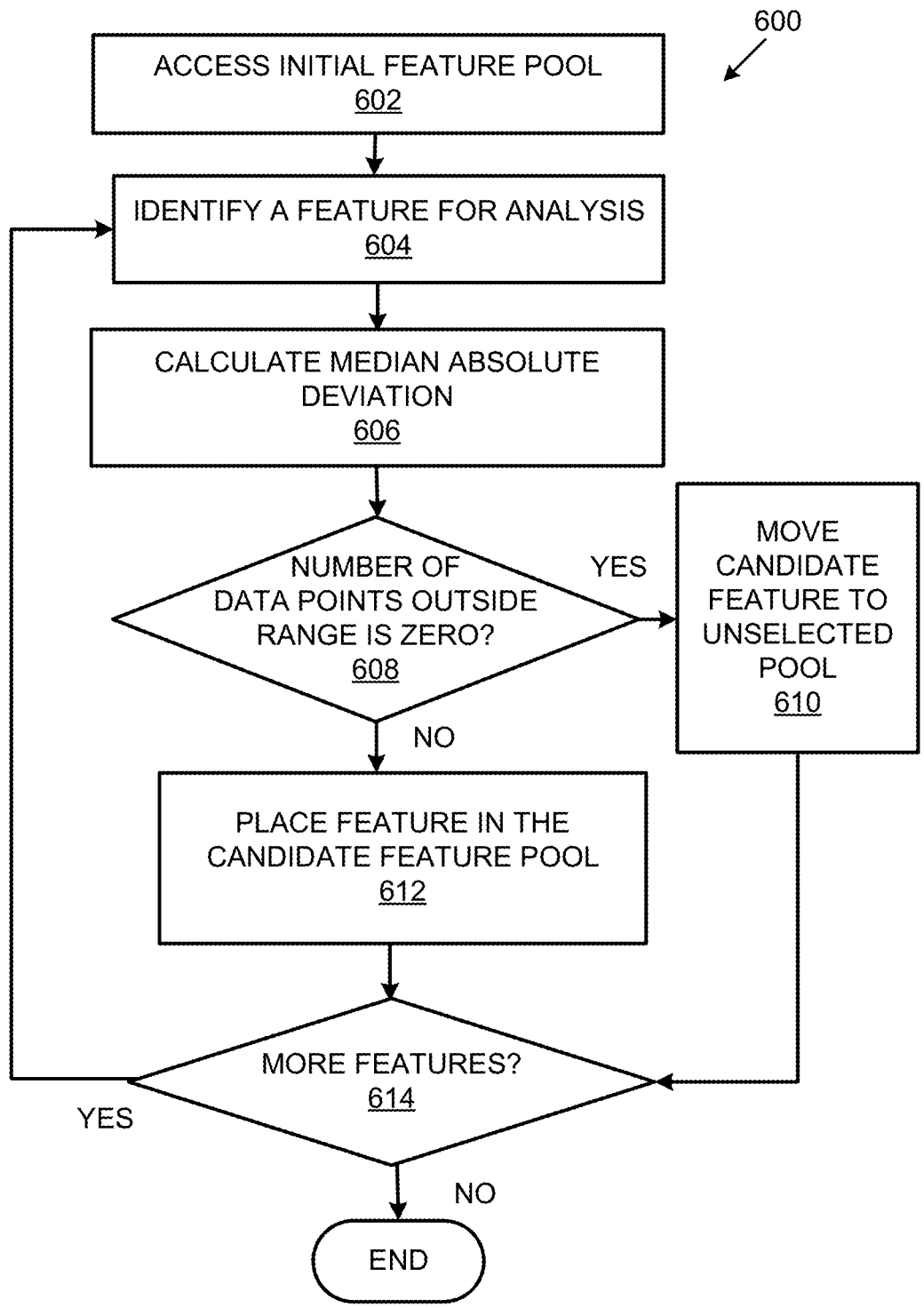
FIG. 6 shows a flowchart that details a candidate feature selection process implemented by the feature selector in accordance with the examples disclosed herein.

FIG. 6 shows a flowchart 600 that details a candidate feature selection process implemented by the feature selector 104 in accordance with the examples disclosed herein. The method begins at 602 with the feature selector 104 accessing an initial feature pool $Z=\{X_1, X_2, \ldots, X_i, \ldots, X_K\}$, where K is the number of features in the feature pool wherein each feature is considered as a univariate case. A feature may not be used if the feature has a distribution that does not contribute to anomaly detection. At 604, a feature can be identified for further analysis for selection into the candidate feature set 'C'. Usually, an outlier detection rule involves observing the interval of "center±1.96×spread", where both center and spread are estimated from the dataset. The center can be estimated by the arithmetic mean and the spread can be estimated by the empirical standard deviation. However, such estimators can be sensitive to outliers. Therefore, a more robust set of estimators including median and median absolute deviation (MAD) are calculated at 206 wherein MAD is defined as:

$$MAD(x) = 1.4826 \, med_j |x_j - med(x)| \qquad \text{Eq. (4)}$$

wherein med denotes the median in Eq. (4). It is determined at 608 if the number of data points from the feature that fall out of the range "median±1.96×MAD(x)" (denoted as $O(X_i)$) are zero. If it is determined at 608 that the number of data points from the feature that fall out of the range "median±1.96×MAD(x)" (denoted as $O(X_i)$) is zero, the feature can be identified as an insignificant contributor for anomaly detection since no data point from this feature is far enough from the center to be considered as an outlier. Therefore, it is excluded as a candidate feature and is moved to an unselected pool (U) at 610. If it is determined at 608 that the number of data points from the feature that fall out of the range "median±1.96×MAD(x)" (denoted as $O(X_i)$) is non-zero, then this feature can be selected and put into the feature candidate pool $C=\{C_1, C_2, \ldots, C_m, \ldots, C_M\}$ at 612, so that the candidate set of features C is associated with distributions that contribute to the outliers in the processed data, and M is the number of candidate features in the candidate feature pool. The method then moves to 614 to determine if further features remain for analysis. If it is determined at 614 that no features remain for analysis, the method terminates on the end block, else if it is determined at 614 that more features remain to be analyzed, the method returns to 604 to select the next feature for analysis.

The first round of feature selection by robust statistics described above in FIG. 6 can reduce the size of the initial feature pool $Z=\{X_1, X_2, \ldots, X_i, \ldots, X_K\}$. The second set of features is automatically selected based on maximum entropy estimation. The idea is to select a further set of features that can give maximum possible information from different dimensions towards detecting anomalies. A greedy algorithm is used to choose the next feature with the criteria that the feature differs the most from all other existing features. This divergence criterion is measured using a weighted Kullback-Leibler (K-L) divergence as detailed below.

Figure 7:
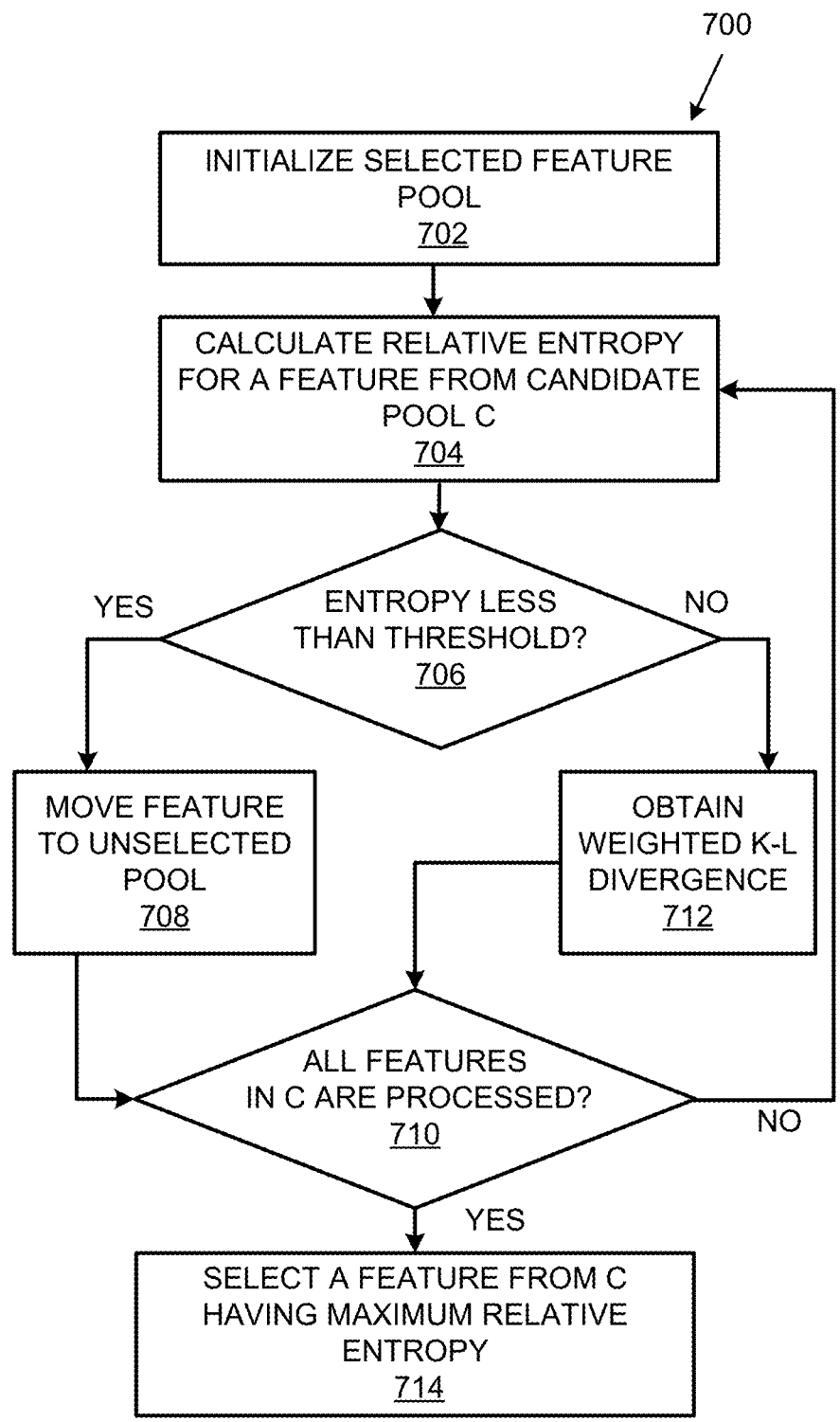
FIG. 7 shows a flowchart that details the method of selecting further features in accordance with the examples disclosed herein.

FIG. 7 shows a flowchart of method 700 that details a method of selecting further features in accordance with the examples disclosed herein. The method begins at 702 with initializing the selected feature pool S. In each iteration, for each feature in a candidate pool C, relative entropy of two features (i.e. feature from C and other features in S) is computed. For example, a feature may be randomly selected from the candidate feature pool C and included into the selected feature pool S. At 704, the relative entropy is calculated for the feature from C and another feature in the selected feature pool S. At 706, it is determined if the relative entropy of the feature is less than a predetermined entropy threshold. Those features with relative entropy below the threshold would not be put into the final selected feature pool as they are being considered as carrying little extra information since they have only a little difference with existing feature distributions. In an example, the predetermined entropy threshold can be empirically determined based on the use-case scenario associated with the feature selection process. If it is determined at 706 that the relative entropy of the feature is below the predetermined entropy threshold, then the feature is placed into an unselected pool at 708. At 710, a determination is made if further features remain for processing in C, and method 700 may be repeated. If at 706, it is determined that the relative entropy of the feature is above the predetermined threshold, the weighted K-L divergence is calculated at 712 for a subset of the candidate set of features that include all existing features in the selected feature pool, where the default weight for each feature is one. For two given distributions P and Q, the K-L divergence can be obtained as:

$$D_{KL}(P\|Q) = \sum_{x \in X} P(x)\log\left(\frac{P(x)}{Q(x)}\right) \qquad \text{Eq. (5)}$$

Upon obtaining the weighted K-L divergence, the method again moves to 710 to determine if further features remain for processing in the candidate feature pool C. If it is determined at 710 that further features remain for processing the method returns to 704 for the next feature from the candidate pool C. If at 710, it is determined that no further features remain for processing in the candidate feature pool C, the method moves to 714 to select the feature with the maximum K-L divergence as the feature to be included in the select feature set S.

Figure 8:
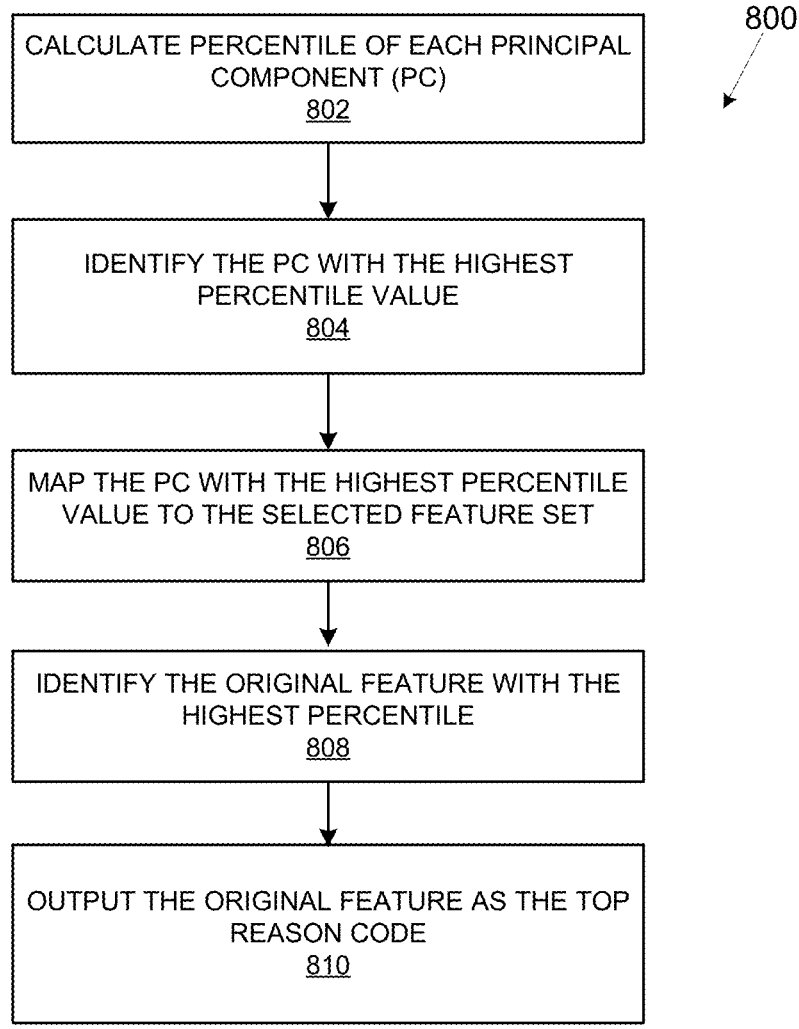
FIG. 8 shows a flowchart that details the reason code back transformation process in accordance with the examples disclosed herein.

FIG. 8 shows a flowchart 800 that details the reason code back transformation process executed by the reason code identifier 112 per the examples disclosed herein. The reason code back transformation is implemented using PCA eigenvectors and the weight of the original feature on its corresponding principal components. The method begins at 802 wherein the percentile value of each PC is calculated after performing PCA transformation on the selected set of features 176, i.e., on the selected set of features transformed by principal components. At 804 the PC with the highest percentile value $V_i$ is identified. At 806, the PC with the highest percent value $V_i$ is mapped back to the original feature space i.e., the selected set of features 176. The original feature $S_j$ having the highest weight to represent for $V_i$ is identified at 808. At 810, $S_j$ is output as the top reason code. Similarly, the m-th top final reason code is obtained by first find the PC with m-th highest percentile and then maps back to the original feature space using the above formula. This reason code back-transformation can help explain which features contribute the most to the anomalies detected. Furthermore, specific feature values or entities that contribute to the detected anomalies can be further isolated. Referring to the shrink loss example, specific employees, particular payment modes, specific stores, or store counters contributing to the shrink losses may be identified. When applied to determining system performances, specific factors that are contributing to lower system performances can be identified. The provision of reason codes thus enhances the applicability of the system 100 to various use case scenarios.

FIG. 9 includes tables and graphs that show the performance of the W-HBOS model. Table 902 shows the performance of the W-HBOS model with three University of California, Irvine (UCI) public datasets that are commonly used for anomaly detection (i.e., shuttle, cardio, and mammography data sets) and compared with the original HBOS model, along with four other outlier detection methods: K-Nearest Neighbor (KNN), Local Outlier Factor (LOF), Clustering Based Local Outlier Factor (CBLOF) and Lightweight on-line detector (LODA). Receiver operator characteristics (ROC) are generated and the corresponding Area Under Curve (AUC) is used as the evaluation metric. The comparison of the AUC of each algorithm obtained at the optimal parameter for the cardio dataset is shown in Table 904. The variation of AUC versus algorithm parameter k for each method is depicted in graph 906, where k is the primary model parameter in each model, i.e. number of neighbors for KNN and LOF, a number of clusters for CBLOF, and a number of bins for LODA, W-HBOS, and HBOS. Noted when training the W-HBOS model with PCA, all principal components are included so the parameter k for PCA, is not compared and the number of principal components is not limited as the method implemented by the system 100 focuses more on removing dependency rather than feature dimension reduction. From table 904 it can be seen that W-HBOS performance is very robust across all data set and gives the highest average AUC compared to other outlier detection methods. This is one of the potential benefits of applying the W-HBOS model for loss prevention scenarios. The W-HBOS model forms a robust model that can generalize well and can be engaged to service customers from a wide range of businesses. The W-HBOS model, therefore, provides better results on different types of datasets. It is also noted that W-HBOS outperforms the regular HBOS on all three data sets, which are largely due to the feature orthogonal transformation by PCA and score weighting using eigenvalue. As shown in graph 906 (which shows k Vs. AUC for different algorithms for cardio data), unlike other methods, the W-HBOS method has more stable performance and is not sensitive to k when k is higher than 10, which makes it easier to for parameter tuning when it is applied to the real world complex datasets to obtain optimal results.

The run time performance of W-HBOS when compared with other methods is shown in graph 908. It is noted that the run time of the W-HBOS method scales very well with data size and only takes about 10 seconds for training data set with a size of $\sim 10^5$, while the nearest-neighbor based methods, such as k Nearest Neighbor (KNN) and Local Outlier Factor (LOF) take much longer time when data size is relatively large, due to their $O(n^2)$ time complexity nature. For loss prevention scenario, the datasets used for the analysis are usually large ones as they spread across a long period of time and cover a large variety of features, and the model would need to be refreshed frequently to keep up with the changing patterns for outlier detection, the fast computation of W-HBOS is another additional advantage for loss prevention modeling.

FIG. 10 shows the various outcomes collected for the apparatus during a case study. FIG. 10 includes a table 1000 with score calibration using the raw score percentile. A case study is provided to better illustrate the W-HBOS model, to demonstrate the application procedure, and to showcase its improved performance. The study of the W-HBOS model was conducted using 16 months' worth of real data that includes transaction, payment, inventory, and personnel information. The case study was designed to explore two types of shrink loss cases: (1) Return abuse, and (2) Discount abuse, at the staff and store level. To elaborate on these two cases, based on the information data and the rich domain knowledge included in the real data, relevant features were extracted for the five scenarios as listed below:

1) Store employee per working hour processed a much higher volume of returns than other employees did on average; 2) Cash-to-Card return ratio; 3) Store employee had a higher volume of returns with no original receipt scanned; 4) Employee discount sales were executed using multiple payment cards, and 5) Sales of discounted items which were sold without discount in the same store and period.

The features are normalized with smoothing factors considering the fact different staff or stores might vary in terms of the handled transaction volume. With the W-HBOS model, a score is calculated for each (month, entity) pair. In this case, the rank of score carries greater significance rather than the raw score itself, since rank is used as an indicator of a pair being an outlier. The results based on the rank of scores would reflect the likelihood of anomaly in each specific dataset. Therefore, the raw scores are calibrated based on percentile by i) getting the raw score percentile of each raw score bin from the original dataset, and ii) mapping raw score percentile to score in calibration table (as shown in table 1000) to recalculate the calibrated score. The calibrated score range is 0-999, with a high score means a higher probability of a pair being an outlier.

The outcome includes a list of anomalous entities identified, along with outlier scores for each entity per month, reason code, raw values, and percentile of features. Further investigations were performed on those listed top employees who had some anomalous behaviors, and it was confirmed most of them had been fraudulent.

The anomalous entities are identified based on whether the score for a given (month, entity) pair is above a score threshold, which is selected by optimizing revenue impact from discount and return abuse scenarios. To compare the performance, the entities are separated into a benchmark group (score below the threshold) and an anomaly group (score above the threshold). In respect of a feature, when the entity level is staff, it was observed that the percentiles of features are higher as scores increase, and the mean percentile is higher in the anomaly group than in the benchmark group in all aforementioned five shrink scenarios shown in Table 1010. Considering the revenue impact from the two events, i.e. return abuse and discount abuse, the group with anomaly exhibited higher than the monetary value benchmark group in monetary value for both returns and discounts. At the staff level, using the score that generates maximum revenue impact as the threshold, 234 staff members with anomalous behaviors were identified. The detection of employee frauds may result in reducing loss in returns by nearly 3.0% and reduce the discount loss by 1.4%, as shown by the data provided in table 1060 that includes statistics of anomalous and benchmark groups in return and discount cases.

Retailers generally do not have many data-driven ML-based intelligence systems to help with detecting internal fraud such as thefts and errors. They either mainly rely on experienced and skillful individuals to analyze the data and develop potential cases or apply costly video recording equipment along with complex retail video analytics on pattern recognition. The W-HBOS model with data-driven automatic feature selection and orthogonal feature transformation using PCA disclosed herein helps to detect internal fraud. Using the customized unsupervised ML solution proposed herein, different entities can be scored and a suspicious list based on the scores can be provided. The ML generated "evidence" can help human agents to easily identify the bad actors with meaningful reasons.

The proposed W-HBOS method removes feature dependency, and is fast, robust, easy-tuning, highly-interpretable, with state-of-art performance. The system 100 is highly suitable in loss prevention scenarios for customers from a wide range of businesses wherein varying data sizes, dimensions, and features are significant.

The performance of the system 100 was evaluated with some domain experts from the retailer industry, and the results are discussed above. It was confirmed that most of the top-scoring entities, e.g. staff, or point-of-sale terminals, were indeed suspicious ones that could cause shrink losses. From the case study, we also showed that the system 100 could indeed result in reducing loss in returns and discounts.

Embodiments of the system 100 can be employed in a wide variety of shrink scenarios for different retailers in different domains by collecting a wider variety of data that covers extended features and incorporates insights in retail shrinks from the corresponding domain experts. The system 100 as disclosed herein can, therefore, be generalized to help loss prevention for retailers from different domains.

Figure 11:
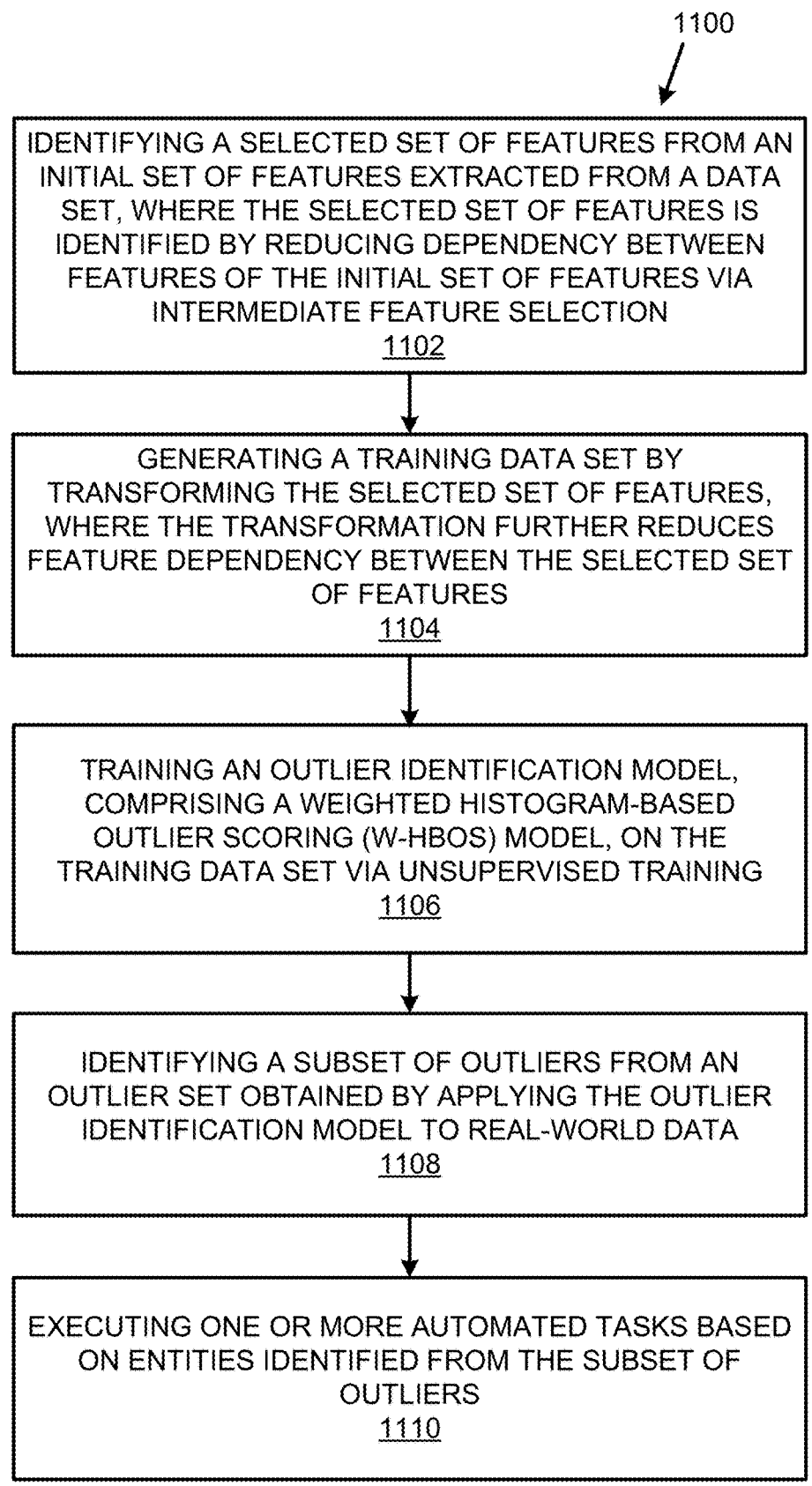
FIG. 11 illustrates a flowchart of an example method for outlier detection in accordance with an embodiment of the present disclosure.
Figure 12:
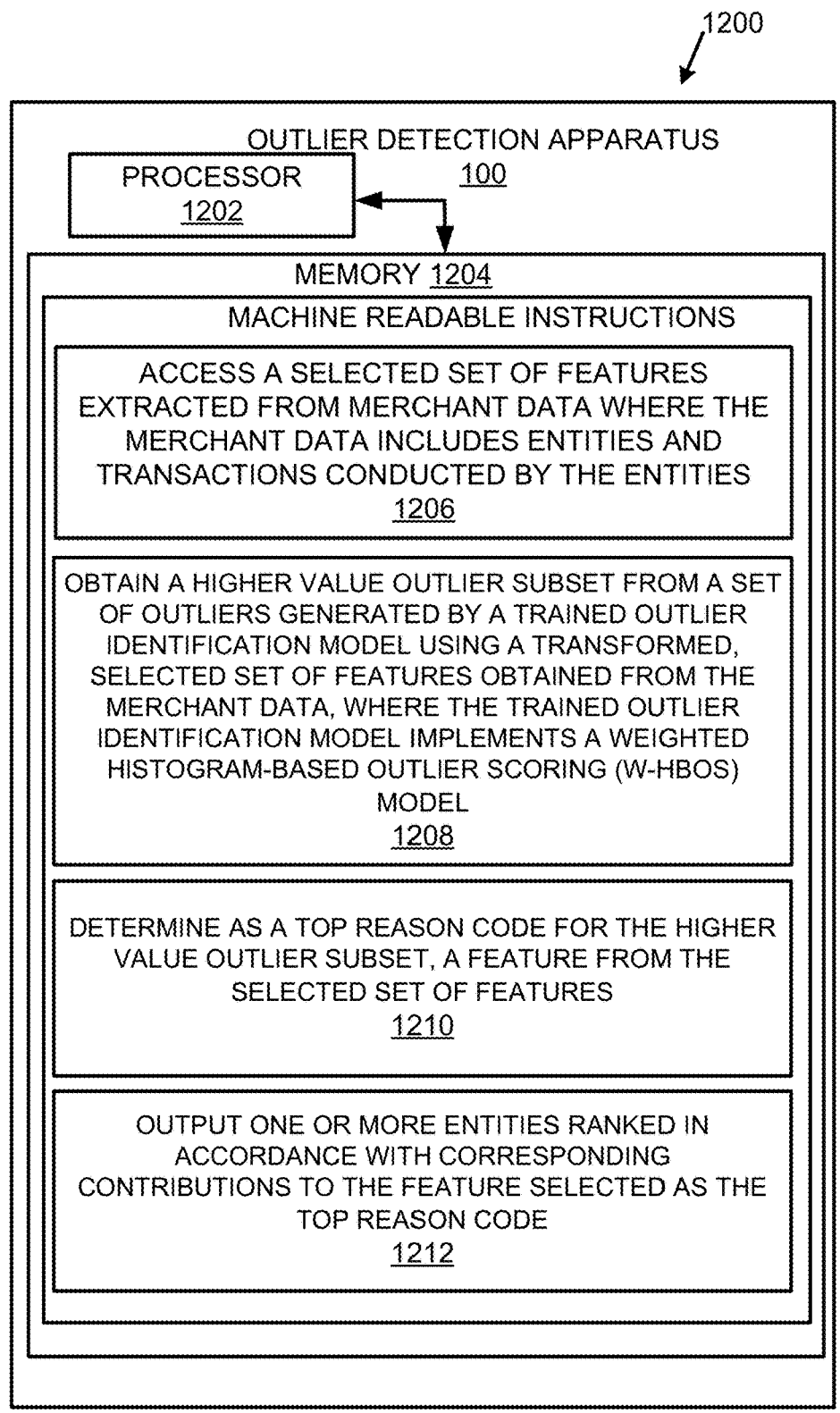
FIG. 12. shows a further example block diagram of a system that detects outliers for loss prevention service implementation in accordance with the examples disclosed herein.
Figure 13:
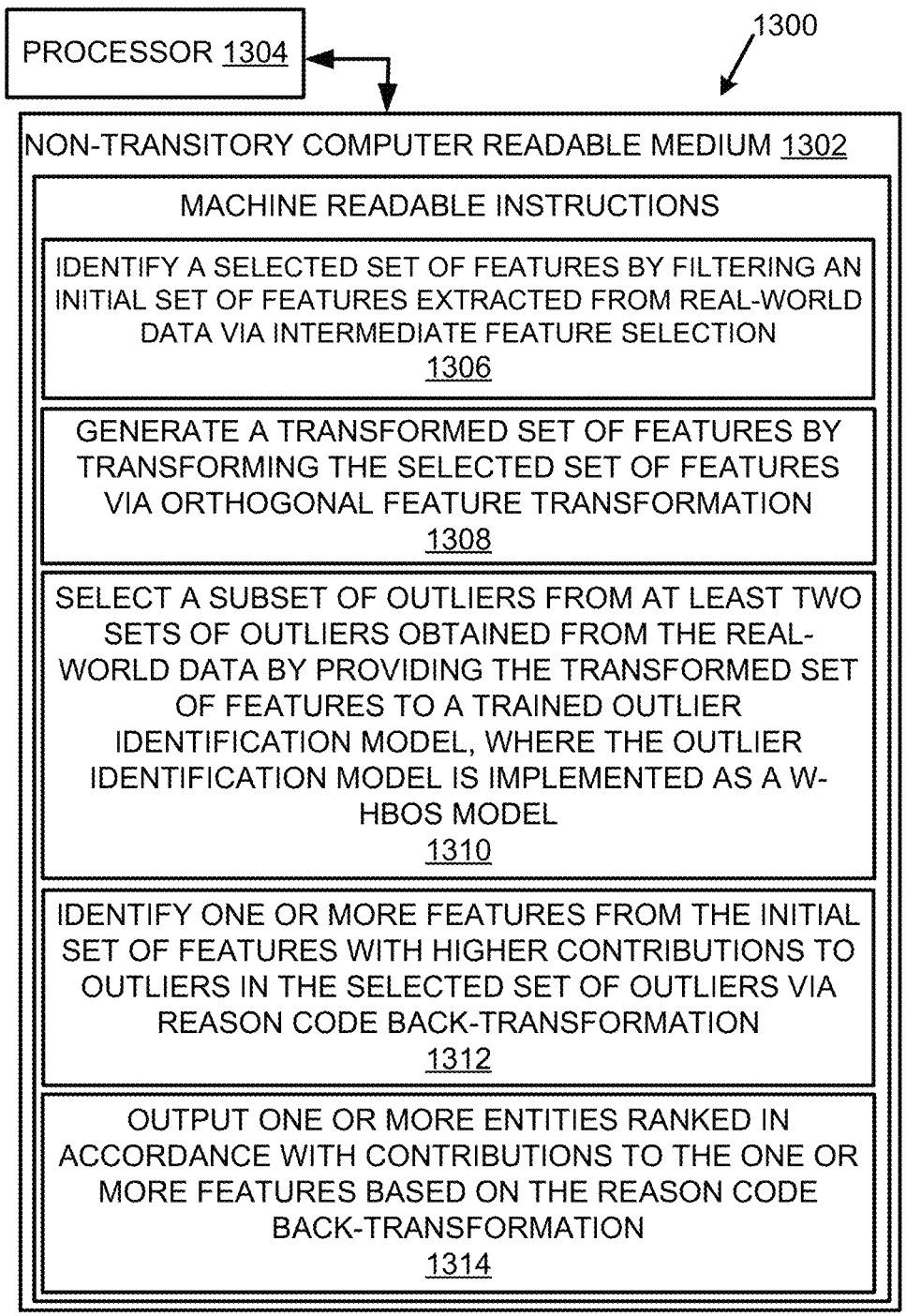
FIG. 13 illustrates a further example block diagram for the outlier detection service implementation in accordance with another embodiment of the present disclosure.

FIGS. 11-13 respectively illustrate a flowchart of an example method 1100, an example block diagram 1200, and a further example block diagram 1300 for outlier detection implementation, according to examples. The method 1100, the block diagram 1200, and the block diagram 1300 may be implemented on the system 100 described above with reference to FIG. 1 by way of example and not of limitation. The method 1100, the block diagram 1200, and the block diagram 1300 may be practiced in another system.

Referring to FIGS. 1-10 and 11, and particularly FIG. 11, for the method 1100, at block 1102, the method may include identifying the selected set of features 176 from the initial set of features 172 extracted from a data set, e.g., the processed data 152, where the selected set of features 176 is identified by reducing dependency between features of the initial set of features 172 via intermediate feature selection.

At block 1104, the method includes generating a training data set (e.g., the transformed set of features 178) by transforming the selected set of features 176, where the transformation further reduces feature dependency between the selected set of features 176.

At block 1106, the method includes training the outlier identification model 110, comprising a Weighted Histogram-based Outlier Scoring (W-HBOS) model, on the training data set via unsupervised training.

At block 1108 the method 1100 includes identifying a subset of outliers from an outlier set output by the trained outlier identification model 110 from the real-world data 190.

At block 1110 the method 1100 includes executing one or more automated tasks using entities from the real-world data 190 identified based on the subset of outliers.

In addition to showing the block diagram 1200, FIG. 12 shows the hardware of the system 100 that may execute the instructions of the block diagram 1200. The hardware may include a processor 1202, and a memory 1204 storing machine-readable instructions that when executed by the processor 1202 cause the processor to perform the instructions of block diagram 1200. The memory 1204 may represent a non-transitory computer-readable medium.

FIG. 11 may represent an example method for outlier detection implementation and the steps of the method. FIG. 13 may represent a non-transitory computer-readable medium 1302 (or the data store 170) having stored thereon machine-readable instructions to provide the outlier detection implementation according to an example. The machine-readable instructions, when executed, cause a processor 1304 to perform the instructions of block diagram 1300 also shown in FIG. 13.

The processor 1202 of FIG. 12 and/or processor 1304 of FIG. 13 may include a single processor or multiple processors or other hardware processing circuit, to execute the methods, functions, and other processes described herein. These methods, functions, and other processes may be embodied as machine-readable instructions stored on a computer-readable medium, which may be non-transitory (e.g., the non-transitory computer-readable medium or 1302 non-transitory processor-readable storage medium of FIG. 13), such as hardware storage devices (e.g., RAM (random access memory), ROM (read-only memory), EPROM (erasable, programmable ROM), EEPROM (electrically erasable, programmable ROM), hard drives, and flash memory). The memory 1204 may include a RAM, where the machine-readable instructions and data for a processor may reside during runtime.

Referring to FIGS. 1-12, and particularly to the block diagram 1200 shown in FIG. 12, the memory 1204 may include instructions 1206 which the processor 1202 executes, or instructions 1206 that cause the processor 1202 to access the initial set of features pertaining to the real-world data which may include merchant data with entities and transactions conducted by the entities.

The processor 1202 may fetch, decode, and execute the instructions 1208 to obtain a high value outlier subset from a set of outliers generated by a trained outlier identification model using a transformed, selected set of features obtained from the merchant data, where the trained outlier identification model implements a Weighted Histogram-based Outlier Scoring (W-HBOS) model.

The processor 1202 may fetch, decode, and execute the instructions 1210 to determine as a top reason code for the higher value outlier subset, a feature from the selected set of features.

The processor 1202 may fetch, decode, and execute the instructions 1212 to output one or more entities ranked in accordance with corresponding contributions to the feature selected as the top reason code.

Referring to FIGS. 1-10 and 13, and particularly FIG. 13, for the block diagram 1300, the non-transitory computer-readable medium 1302 may include instructions 1306 to identify a selected set of features by filtering an initial set of features extracted from the real-world data 190 via intermediate feature selection.

The processor 1304 may fetch, decode, and execute the instructions 1308 to generate a transformed set of features by transforming the selected set of features via orthogonal feature transformation.

The processor 1304 may fetch, decode, and execute the instructions 1310 to select a subset of outliers from at least two sets of outliers obtained from the real-world data by providing the transformed set of features to a trained outlier identification model, where the outlier identification model is implemented as a Weighted Histogram-based Outlier Scoring (W-HBOS) model.

The processor 1304 may fetch, decode, and execute the instructions 1312 to identify one or more features from the initial set of features with higher contributions to outliers in the selected set of outliers via reason code back-transformation.

The processor 1304 may fetch, decode, and execute the instructions 1314 to output one or more entities ranked in accordance with contributions to the one or more features.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A computer-implemented, outlier detection method, comprising:
    identifying a selected set of features from an initial set of features extracted from a data set, where the selected set of features is identified by reducing dependency between features of the initial set of features via an intermediate feature selection;
    generating a training data set by transforming the selected set of features, where the transformation further reduces feature dependency between the selected set of features;
    training an outlier identification model, comprising a Weighted Histogram-based Outlier Scoring (W-HBOS) model, on the training data set via unsupervised training;
    selecting one of a higher value outlier subset and a lower value outlier subset included in an outlier set obtained by applying the outlier identification model to real-world data,
        wherein the higher value outlier subset and the lower value outlier subset are identified based on comparison of outliers in the outlier set with a median value of the outlier set; and
    executing one or more automated tasks using entities from the real-world data identified based on the subset of outliers.

2. The method of claim 1, where the intermediate feature selection further comprises:
    identifying as significant contributors to anomaly detection, a candidate set of features from the initial set of features, where the candidate set of features is identified by comparing a median absolute deviation (MAD) for each feature of the initial set of features with a predetermined median threshold.

3. The method of claim 2, where identifying the selected set of features from the initial set of features further comprises:
    filtering a subset of the candidate set of features using a divergence criterion to generate the selected set of features.

4. The method of claim 1, where transforming the selected set of features further comprises:
    generate linear, uncorrelated combinations of the selected set of features via orthogonal feature transformation with eigenvalues from principal components as weights to corresponding features of the selected set of features.

5. The method of claim 4, where the orthogonal feature transformation includes principal component analysis (PCA).

6. The method of claim 1, where selecting one of the higher value outlier subset and the lower value outlier subset from the outlier set further comprises:
    assigning the median value to values of each of the outliers that are correspondingly below or above the median value.

7. The method of claim 6, further comprising:
    enabling selection of one of the higher value outlier subset and the lower value outlier subset further includes:
        designating an original median bin to be a majority bucket; and
        lowering an inverse height of a histogram representing the original median bin.

8. The method of claim 1, comprising:
    calculating a percentile value of each principal component generated via orthogonal feature transformation of a selected set of features extracted from the real-world data;
    identifying one of the principal components with a highest percentile value; and
    determining a top reason code based on the identified one of the principal components with the highest percentile value.

9. The method of claim 8, comprising:
mapping the principal component with the highest percentile value to the selected set of features to determine a feature for the top reason code; and
determining the entities identified based on the subset of outliers according to the feature for the top reason code.

10. The method of claim 1, where executing the one or more automated tasks based on the entities further comprises:
automatically transmitting an alert with the entities to preconfigured parties.

11. An automatic outlier detection and analysis system, comprising:
a processor; and
a computer-readable medium on which is stored machine-readable instructions that cause the processor to:
access a selected set of features extracted from merchant data where the merchant data includes entities and transactions conducted by the entities;
obtain a higher value outlier subset from a set of outliers generated by a trained outlier identification model using a transformed, selected set of features obtained from the merchant data, where the trained outlier identification model implements a Weighted Histogram-based Outlier Scoring (W-HBOS) model;
determine as a top reason code for the higher value outlier subset, a feature from the selected set of features; and
output entities determined from the merchant data that are ranked in accordance with corresponding contributions to the feature selected as the top final reason code.

12. The automatic outlier detection and analysis system of claim 11, storing further machine-readable instructions that cause the processor to:
select a candidate set of features from an initial set of features extracted from the merchant data, where the candidate set of features includes features from the initial set of features that contribute to the outliers in the merchant data; and
identify the selected set of features by further filtering a subset of the candidate set of features based on a divergence criterion.

13. The automatic outlier detection and analysis system of claim 12, where to identify the selected set of features the processor is to:
obtain relative entropies for each feature of the candidate set of features with respect to other features in the initial set of features; and
generate the subset of the candidate set of features by discarding features from the candidate set of features having relative entropies less than a predetermined entropy threshold.

14. The automatic outlier detection and analysis system of claim 13, where to identify the selected set of features the processor is to:
obtain weighted Kullback-Leibler (K-L) divergence for each feature from the subset of the candidate set of features having the relative entropy above the predetermined threshold; and
include one or more features from the subset of the candidate set of features with relatively higher (K-L) divergences into the selected set of features.

15. The automatic outlier detection and analysis system of claim 13, wherein instructions for obtaining the higher value outlier subset stores further machine-readable instructions that cause the processor to:
assign a median value to each of the transformed, selected set of features that are below the median value.

16. The automatic outlier detection and analysis system of claim 11, storing further machine-readable instructions that cause the processor to:
generate the transformed, selected set of features as linear, uncorrelated combinations of the selected set of features via orthogonal feature transformation with eigenvalues from principal components as weights to corresponding features of the selected set of features.

17. The automatic outlier detection and analysis system of claim 11, where to output the one or more entities the processor is to:
calculate a percentile value of each feature of the transformed, selected set of features;
identify a principal component with a highest percentile value as a top raw reason code; and
identify a top final reason code for the higher value outlier subset by mapping the highest percentile value to a feature in the initial set of features.

18. The automatic outlier detection and analysis system of claim 11, where the one or more entities include employees, the subset of outliers include shrink losses and at least one of the initial set of features includes a cash-to-card return ratio.

19. A non-transitory processor-readable storage medium comprising machine-readable instructions that cause a processor to:
identify a selected set of features by filtering an initial set of features extracted from real-world data via an intermediate feature selection;
generate a transformed set of features by transforming the selected set of features via orthogonal feature transformation;
select a subset of outliers from at least two sets of outliers obtained from the real-world data by providing the transformed set of features to a trained outlier identification model, where the trained outlier identification model is implemented as a Weighted Histogram-based Outlier Scoring (W-HBOS) model;
calculate a percentile value of each principal component of the transformed set of features;
map the principal component with the highest percentile value to the selected set of features;
identify based on the mapping, one or more features from the initial set of features with higher contributions to outliers in the selected subset of outliers;
identify one of the one or more features as a top final reason code for the outliers; and
output one or more entities ranked in accordance with contributions to the feature identified as the top final reason code.

* * * * *